(12) United States Patent
Gibbons et al.

(10) Patent No.: US 7,676,893 B2
(45) Date of Patent: Mar. 16, 2010

(54) SILENCER PLATING FOR FASTENERS

(75) Inventors: Matthew H. Gibbons, Farmington Hills, MI (US); Terrence B. MacPherson, Marysville, MI (US)

(73) Assignee: Newfrey LLC, Newark, DE (US)

( * ) Notice: Subject to any disclaimer, the term of this patent is extended or adjusted under 35 U.S.C. 154(b) by 288 days.

(21) Appl. No.: 11/399,672

(22) Filed: Apr. 6, 2006

(65) Prior Publication Data

US 2006/0254032 A1    Nov. 16, 2006

Related U.S. Application Data

(60) Provisional application No. 60/669,316, filed on Apr. 7, 2005.

(51) Int. Cl.
  *A44B 21/00* (2006.01)
  *F16B 5/06* (2006.01)
(52) U.S. Cl. .......................................... 24/295; 24/289
(58) Field of Classification Search .................. None
See application file for complete search history.

(56) References Cited

U.S. PATENT DOCUMENTS 5,263,233 A * 11/1993 Kim et al. ............... 24/295

5,482,637 A    1/1996 Rao et al.
2002/0104201 A1 * 8/2002 Smith et al. ................... 24/293

OTHER PUBLICATIONS

The Illustrated Science and Invention Encyclopedia, International Edition, "how it works," previously published in parts in the United Kingdom under the title, "How It Works.", H.S. Stuttman, Inc. publishers, Westport, Connecticut, Marshall Cavendish Limited 1974, 1976, 1977, 1983, Lubrication / pp. 1417-1418.

McGraw-Hill Encyclopedia of Science & Technology 10 LIB-META, 9$^{th}$ Edition, McGraw-Hill, 2002, Lubricant, pp. 179-185.

* cited by examiner

*Primary Examiner*—Jack W. Lavinder
(74) *Attorney, Agent, or Firm*—Harness, Dickey & Pierce, P.L.C.

(57) ABSTRACT

A fastener to removably mount an object in a mounting aperture of a panel is provided. The fastener includes a body having two opposing side members and defining a second aperture configured to accept at least a portion of the object, at least one elastic abutting flange disposed between the fastener body and the mounting aperture, a corrosion resistant coating, and a silencer plating overlying the corrosion resistant coating.

28 Claims, 13 Drawing Sheets

SECTION A A

SECTION B B

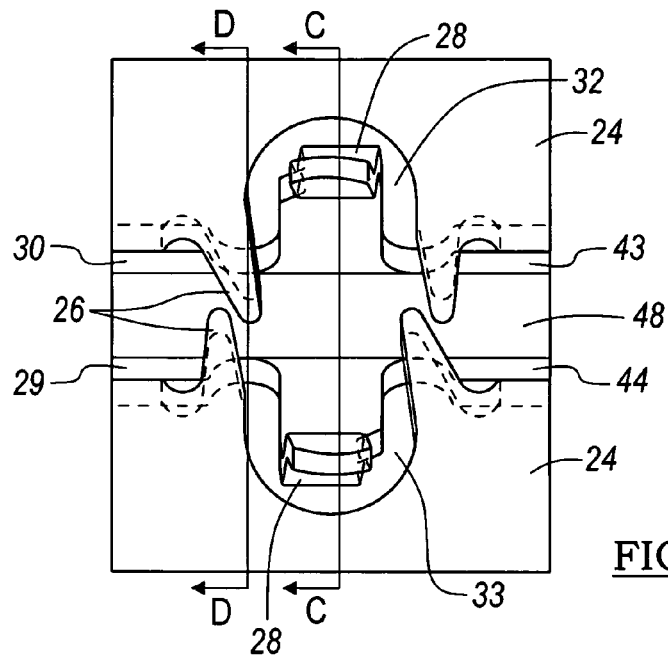
FIG. 5A
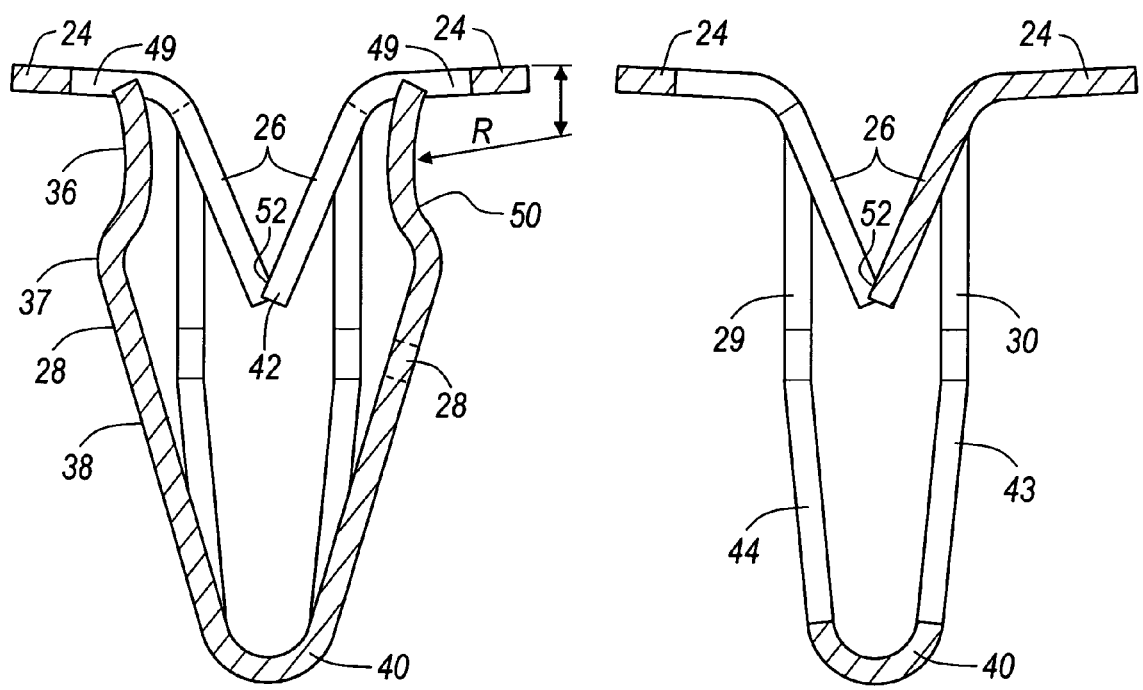
FIG. 5B
SECTION C C
FIG. 5C
SECTION D D

SECTION A A

SECTION B B

SECTION C C

SECTION D D

SILENCER PLATING FOR FASTENERS

CROSS-REFERENCE TO RELATED APPLICATIONS

This application claims the benefit of U.S. Provisional Application No. 60/669,316, filed on Apr. 7, 2005. The disclosure of the above application is incorporated herein by reference.

TECHNICAL FIELD

The present invention relates generally to resilient clip fasteners and more particularly to a resilient clip fastener that employs a particular surface geometry to secure the body portion of the resilient clip to a structure. The invention also relates to a resilient clip fastener having corrosion-resistant silencer plating.

BACKGROUND OF THE INVENTION

The statements in this section merely provide background information related to the present disclosure and may not constitute prior art.

Many vehicles employ resilient clips to secure various components to the vehicle body. One such application concerns interior panels that mount to the interior of the vehicle such as panels that mount onto the doors of the vehicle. Such panels serve not only to provide occupants with a convenient point to grasp during ingress to and egress from the vehicle, but also provide energy absorption during a crash event.

It is conventional procedure that the entire panel assembly is installed onto the interior of the vehicle in a single operation. In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

If misalignments occur between the fasteners and their corresponding mounting holes during this panel-securing operation, some of the fasteners may not be properly seated. Not only do these misalignments reduce the overall security of the panels to the sheet metal, but they also may cause excessive noise or squeaking from movement of the fastener against the sheet metal as forces are transmitted through the vehicle when the vehicle is driven over bumps or other irregularities in the road; such movement generates acoustical vibrations heard as the noise or squeaking. Such noise or squeaking can be annoying to the driver and any passengers in the vehicle.

Lubrication may be used to prevent the noise; but some lubricants only temporarily reduce friction, and specific types of lubricants are undesirable for use with interior trim. For example, it may not be desirable to use a "wet" lubricant, such as oil or grease, near locations of fabric or leather upholstery since the "wet" lubricant might stain the upholstery. Such staining risk is further aggravated in some installation situations where, for example, a line operator's view of the fastening components becomes highly limited during panel installation as the fastening components are meshed or connected. While dry lubricating films do not stain the interior, they can be highly moisture sensitive and susceptible to corrosion.

Accordingly, there remains a need in the art for an improved fastener having a relatively low installation force, a relatively high removal force, and an improved (relative to the present approach and issues described above) tolerance to misalignments in a fastened assembly made through use of the fastener. It is further desirable that the fastener include a dry lubrication feature with improved features to reduce vibration noise, improve wear, and withstand the change of temperature and humidity within the vehicle under the operating conditions of the vehicle. Ideally, the fastener should be inexpensive to manufacture as well as being reliable and simple to install.

SUMMARY OF THE INVENTION

The present invention provides a fastener having at least one metallic abutting flange for slidably and compressively interfacing against the inner surface of a mounting aperture. A dry sulfur-containing lubricant surface of the flange bears against the inner surface, and corrosion suppressant is in chemically reactive contact with the lubricant of the surface. The lubricant surface suppresses acoustic waves generated from vibrating movement of the inner surface against the flange so that the acoustic waves are essentially inaudible to the human ear.

In one embodiment, the present invention provides a fastener adapted to removably mount an object in a mounting aperture of a panel. The fastener body has two opposing side members and also defines a second aperture configured to accept at least a portion of the object. The fastener body has at least one elastic abutting flange defining an exterior concave portion extending a width of the abutting flange, and the abutting flange is configured to engage an inner surface of the mounting aperture when the fastener is inserted into the mounting aperture. In this embodiment, the elastic abutting flange is disposed between the fastener body and the mounting aperture. A corrosion resistant coating is a part of the fastener and silencer plating overlies the corrosion resistant coating.

In another embodiment, the present invention provides a U-shaped fastener adapted to be removably mounted within a mounting aperture of a panel. The fastener comprises a body defining a pair of generally parallel members coupled by a curved end member where at least one of the parallel members comprises a first and second pair of finger members configured to slidably accept a coupling flange and to tightly engage the coupling flange to the fastener after the coupling flange is slidably accepted. The fastener also comprises a pair of abutting flanges with each abutting flange of the pair independently defining an exterior concave surface extending a width of the abutting flange and configured to engage an inner surface of the mounting aperture when the fastener is inserted into the mounting aperture. Corrosion resistant coating is disposed on each abutting flange where the exterior surface is-configured to engage the inner surface; and silencer plating overlies the corrosion resistant coating.

In yet another embodiment, the present invention provides a fastener for removably mounting a coupling flange in a panel aperture. The fastener comprises a base portion and two opposing side walls integrally connected to the base portion and forming a substantially U-shaped body, where each side wall of the two opposing side walls has an outwardly extending top flange member. A pair of elastic abutting flanges are integrally formed with and outwardly extending from the base portion, and a first pair of spaced apart finger members are integrally formed with each top flange member. The fastener has corrosion resistant coating disposed on each abutting flange, and the fastener has silencer plating overlying the corrosion resistant coating. The pair of finger members inwardly extend into the body of the fastener and are configured to grippingly engage the coupling flange.

In one aspect, the present invention provides a method for attaching a component to a mounting aperture of a structural support so that the component can be optionally removed from the support. The method first affixes a fastener to the component, the fastener having at least one metallic abutting flange that slidably and compressively interfaces against an inner surface of the mounting aperture; the flange has a dry sulfur-containing lubricant surface (for bearing against the inner surface) and corrosion suppressant in chemically reactive contact with the lubricant surface. The method then inserts the fastener within the mounting aperture to compressively bear the abutting flange against the inner surface. The lubricant surface suppresses acoustic waves generated from vibrating movement of the inner surface against the flange so that the acoustic waves are essentially inaudible to the human ear.

In another aspect, the present invention provides a method for attaching a component to a mounting aperture of a structural support so that the component can be optionally removed from the aperture. The component has at least one metallic abutting flange that slidably and compressively interfaces against an inner surface of the mounting aperture. The method comprises adhering dry sulfur-containing lubricant and corrosion suppressant to an interface surface of the flange such that the corrosion suppressant is in chemically reactive contact with the lubricant, and then inserting the fastener within the mounting aperture to compressively bear the lubricant of the abutting flange against the inner surface. The lubricant is adhered to be sufficient to suppress acoustic waves generated from vibrating movement of the inner surface against the flange so that the acoustic waves are essentially inaudible to the human ear.

In a preferred embodiment of a fastener, the silencer plating comprises molybdenum disulfide and the corrosion resistant coating comprises zinc. In one embodiment, a fastener is configured for insertion into a mounting aperture with an insertion force less than about 10 pounds, and for removal from the panel aperture with a removal force greater than about 20 pounds.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Additional advantages and features of the present invention will become apparent from the subsequent description and the appended claims, taken in conjunction with the accompanying drawings, wherein:

FIGS. 3b and 3c depict cross-sectional views of the fastener depicted in FIG. 3a;

FIG. 5a is a top view of a portion of the fastener of FIG. 1, illustrating the clip structure in greater detail;

FIGS. 5b and 5c depict cross-sectional views of the fastener depicted in FIG. 5a;

FIGS. 14b and 14c depict cross-sectional views of the fastener depicted in FIG. 14a;

FIG. 15a is a side view of a portion of the fastener of FIG. 14a;

FIG. 15b is a top view of the fastener of FIG. 15a;

DETAILED DESCRIPTION OF THE PREFERRED EMBODIMENT

Figure 1:
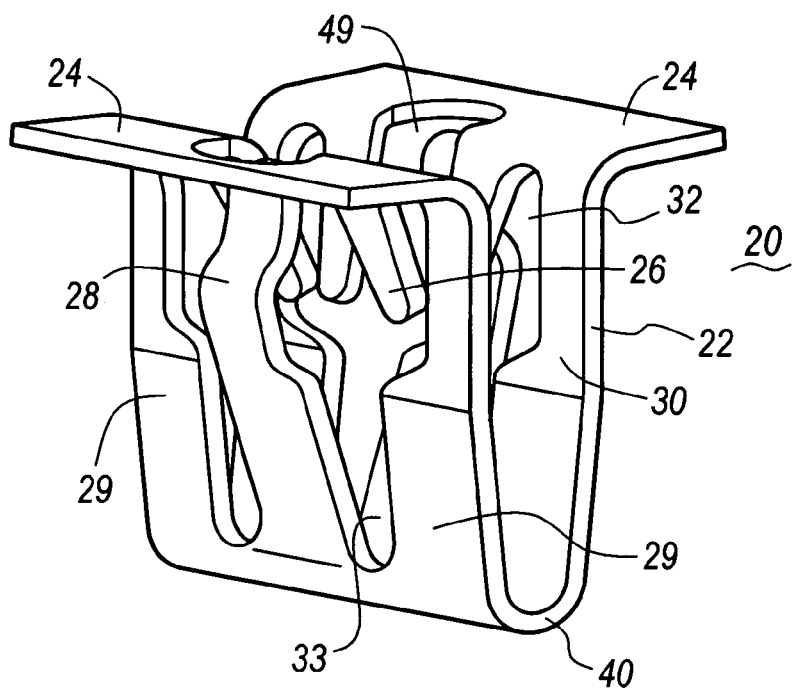
FIG. 1 is a perspective view of a fastener constructed in accordance with the teachings of the present invention.

The following description is merely exemplary in nature and is not intended to limit the present disclosure, application, or uses. It should be understood that throughout the drawings, corresponding reference numerals indicate like or corresponding parts and features Referring to FIGS. 1 through 8, a generally U-shaped fastener 20 in accordance with the present invention is disclosed. The generally U-shaped fastener 20 is defined by a body portion 22 and a pair of top flanges 24. Integral with the top flanges 24 are two pair of finger members 26 which are used to couple the generally U-shaped fastener 20 to a mounting flange (shown in FIG. 11). Additionally, the body portion 22 has a pair of abutting flanges 28 which generally lie outside side members 29 and 30 of the body portion 22. The side members 29 and 30, which are coupled by a curved bottom member 40 (base portion 40), define a pair of apertures 32 and 33, which allow for the inward compression of the abutting flanges 28.

Figure 2:
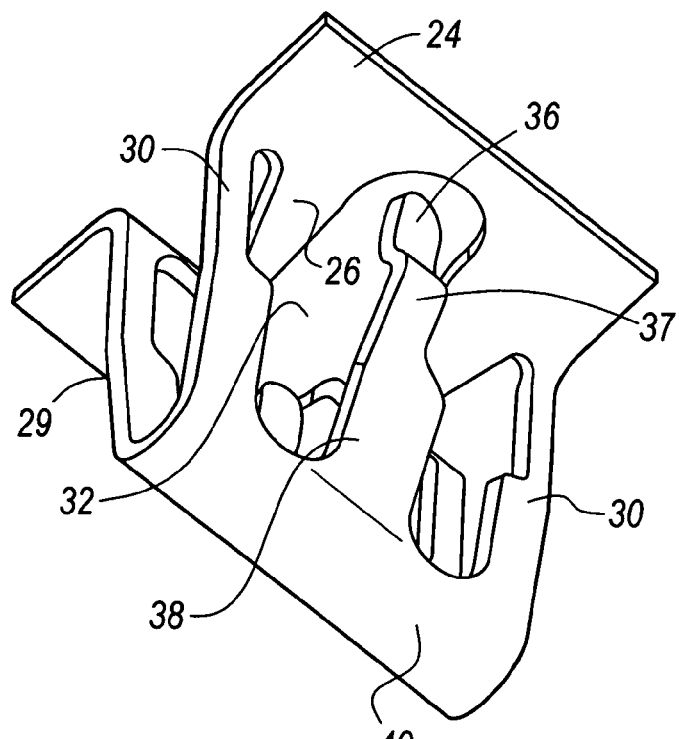
FIG. 2 is a lower perspective view of the fastener of FIG. 1.

Generally, as shown in FIG. 2, each of the abutting flanges 28 is further defined by having three portions. The first portion 36 is defined by a concave exterior engaging surface 50. The second portion 37, which acts as a transition to the third portion 38, is defined by a convex exterior surface. The third portion 38 functions to couple the abutting flange 28 to the base portion 40 of the body portion 22 of the generally U-shaped fastener 20.

Figure 3A:
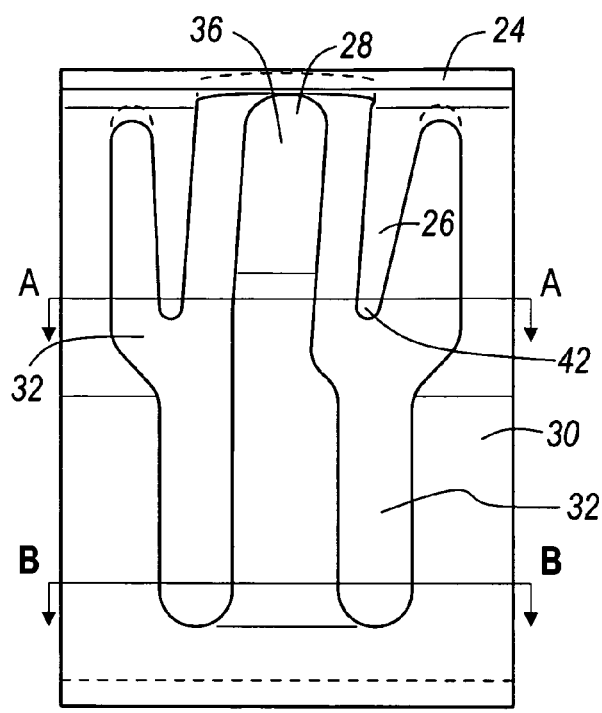
FIG. 3a is a side view of a portion of the fastener of FIG. 1 illustrating the spacing of the structures in greater detail.
Figure 4:
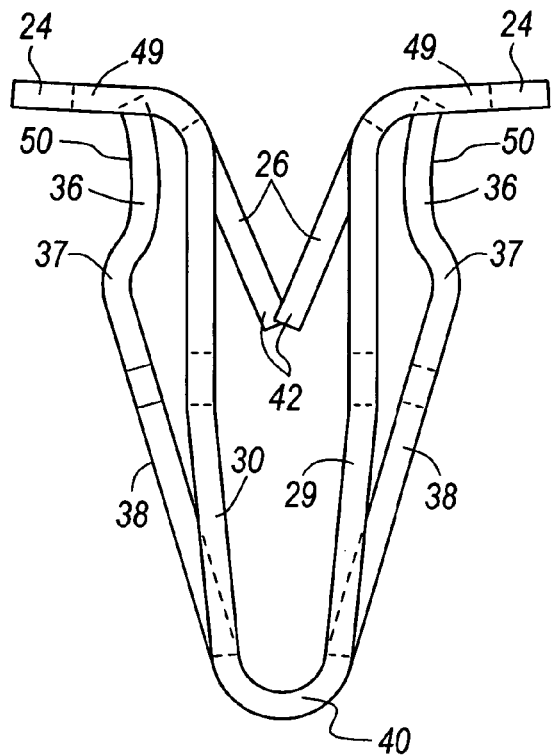
FIG. 4 is a side view of a fastener constructed in accordance with the teachings of a preferred embodiment of the present invention.
Figure 3B:
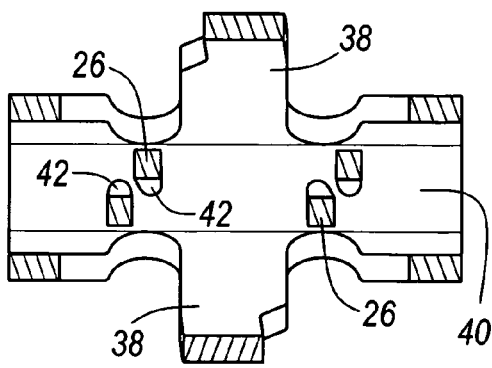
Figure 3C:
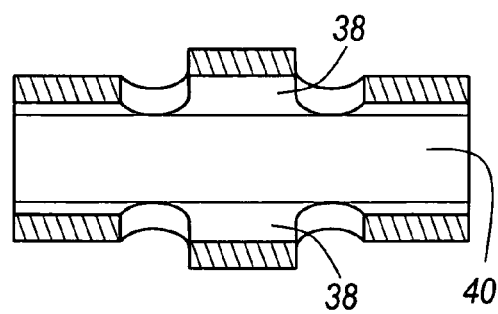

FIG. 3a depicts a first side view (along the axis of curvature for base portion 40) of the generally U-shaped fastener 20 of the current invention. Shown is the relationship of the finger members 26 to the abutting flanges 28, which are formed within the aperture 32. As best seen in FIGS. 3b and 4, the tips 42 of the finger members 26 are angled to frictionally engage a flange member 54 of a trim component 60 (see FIG. 11). The A-A cross-sectional view of FIG. 3b (reference from FIG. 3a) and the B-B cross-sectional view of FIG. 3c also show the relationship of the third portions 38 to the base member 40 of the body portion 22 for the fastener.

FIG. 4 depicts a second side view (in a plane perpendicular to the axis of curvature for base portion 40) of the U-shaped fastener 20 and shows the relationship of portions 36, 37, and 38 of the abutting flanges 28 to members 29, 30, and 40 of the body portion 22. As can be seen, each of the top flanges 24 define a respective upper keyhole slot 49, and slots 49 allow the movement of the abutting flanges 28 when they are compressed. Further depicted is the angular relationship of the side members 29 and 30 of the body portion with respect to the base 40 and the top flanges 24. It must be noted that while the finger members 26 are shown, any suitable fastener is usable. This includes but is not limited to a hole, a threaded hole, slots, or flanges.

FIG. 5a depicts a top view of the generally U-shaped fastener 20. Defined by the side members 29 and 30 is a slot 48 which is used to engage the coupling flange 54 (see FIGS. 9 and 11) of a trim component 60. The concave exterior surface 50 (see FIGS. 4 and 5b) of the abutting flanges 28 are used to engage sheet metal to hold the fastener in place. Also depicted is the interior surface 52 (FIG. 5b) of the finger members 26, which engage the surfaces of the coupling flange 54 (see FIGS. 9 and 11). Exterior concave surface 50 comprises silencer plating. The silencer plating is coated upon a corrosion resistant coating that is, in turn, coated onto the fastener substrate of abutting flange 28. Structural coating detail respective to exterior concave surface 50 is further described in the discussion of FIG. 22.

FIG. 5b displays the C-C cross-sectional view of the fastener as referenced in FIG. 5a. Depicted is the relationship of the abutting flanges 28 with the base member 40. Further, the cross-section details the radius of the exterior concave surface 50. The radius of the concave surface 50 generally can be from about 3.5 to about 6.0 millimeters and, preferably, about 4.75 millimeters. The center of curvature for the radius R is from about 2 to about 4 millimeters from the top of the fastener and, preferably, about 2.3 millimeters. The D-D cross-sectional view (reference in FIG. 5a) in FIG. 5c of the fastener best details the relationship of the finger members 26 to the top flanges 24 and to the first and second flange members 43 and 44.

Figure 6:
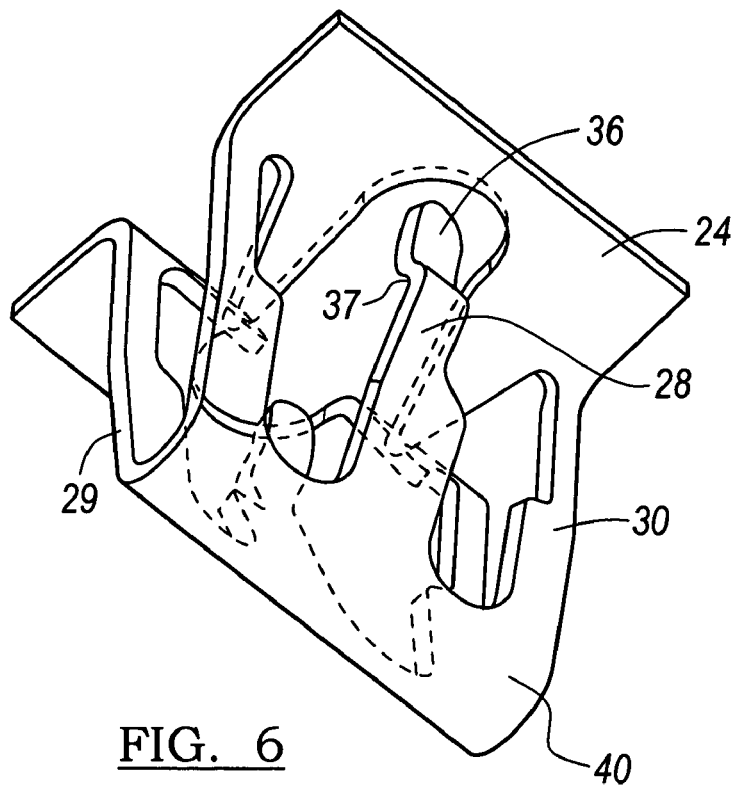
FIG. 6 is a lower perspective view of the fastener of FIG. 1.
Figure 7:
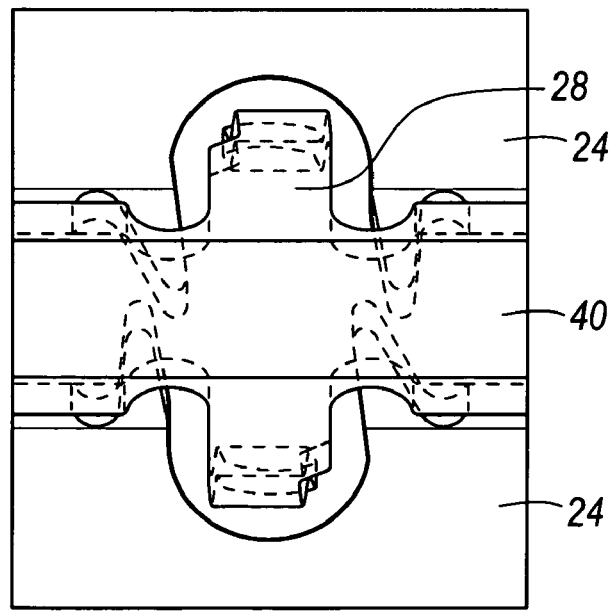
FIG. 7 is a bottom view of the fastener of FIG. 1.
Figure 8:
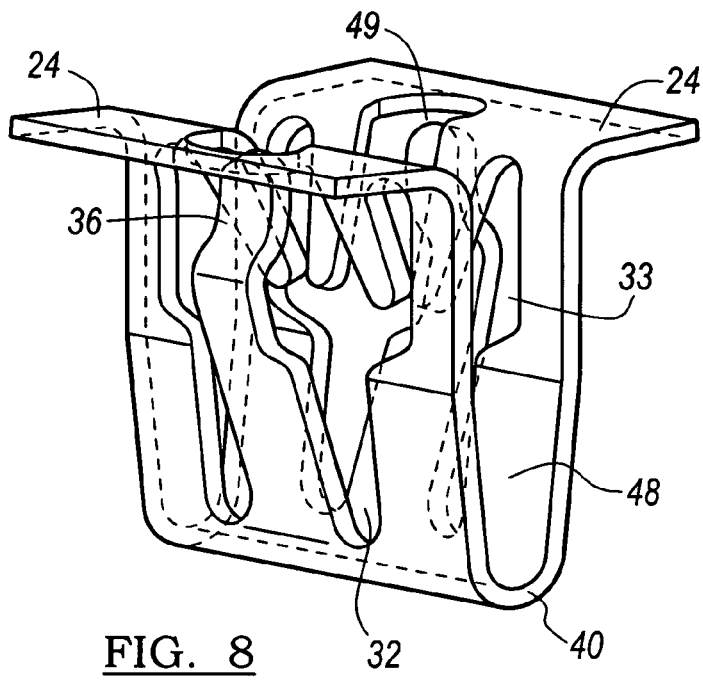
FIG. 8 is a perspective view of the fastener of FIG. 1.

FIGS. 6 through 8 are depictions of the U-shaped fastener 20 of the current invention with hidden components shown in phantom. Depicted is the relationship of the fastener components with various surfaces of the fastener.

Figure 9:
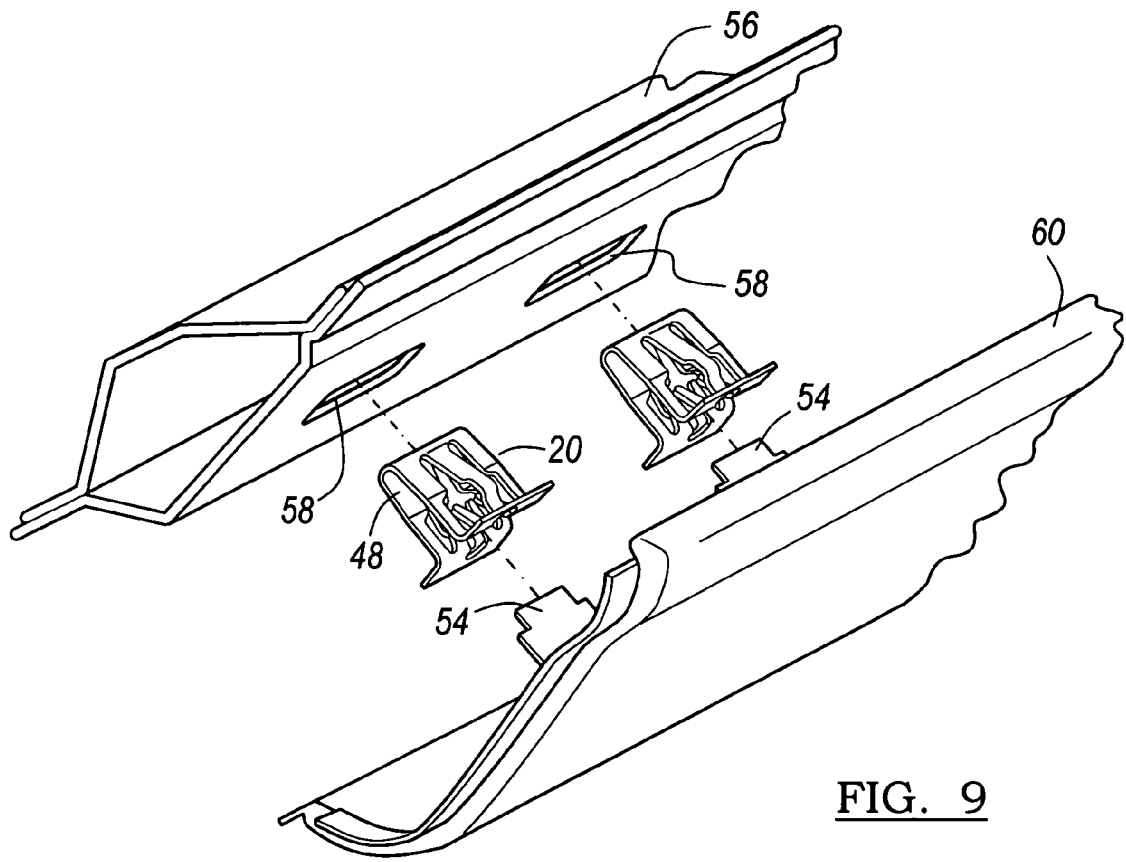
FIG. 9 is an exploded perspective view showing the fastener being used to mount an interior trim component.

FIG. 9 depicts the use of the U-shaped fastener 20 of the current invention. Shown is a sheet metal structure 56, which defines a pair of apertures 58. The apertures 58 are designed to accept the U-shaped fastener 20 to allow for the mating of a trim component 60 to the sheet metal 56. The trim component 60 has a pair of flanges 54, which are inserted into the slot 48 of the U-shaped fastener 20.

Figure 10A:
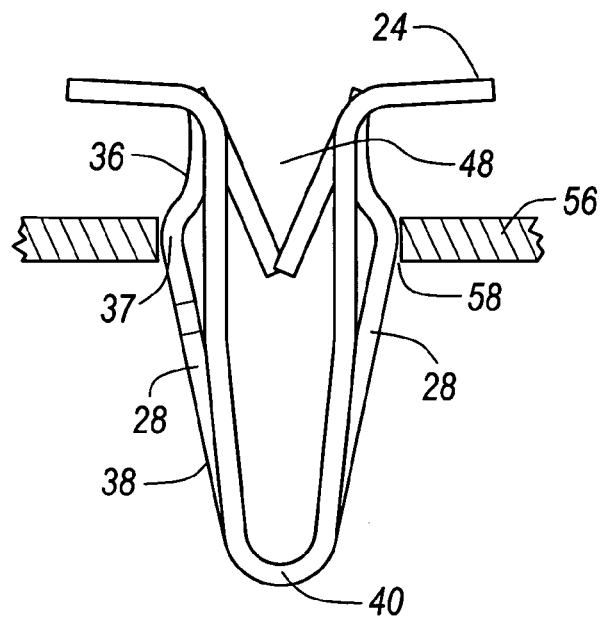
FIGS. 10a and 10b show the insertion of the fastener.
Figure 10B:
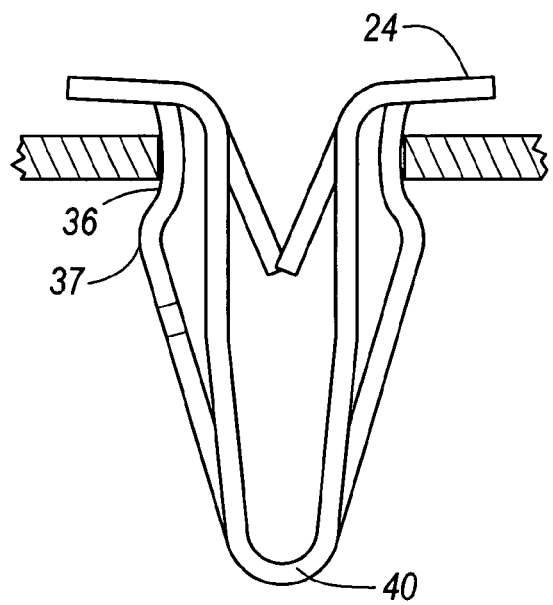

As best seen in FIG. 10a and FIG. 10b, the U-shaped fastener 20 is inserted into the aperture 58 of the sheet metal structure 56. As the fastener 20 is depressed into the aperture 58, the abutting flanges 28 are compressed toward each other and the centerline of the U-shaped fastener 20. This compression of the abutting flanges 28 continues until the sheet metal 56 of the aperture 58 reaches the second portion 37 of the abutting flanges. At this point, a transition occurs and the sheet metal 56 is allowed to engage (FIG. 10b) with the concave surface 50 of the first portion 36 of the abutting flanges 28. In this regard, the bottom or minimal extremum of concave curvature for each concave surface 50 of the first portion 36 of each abutting flange 28 rests, in fastened position, against the defining edge of aperture 58 in sheet metal structure 56.

Figure 11:
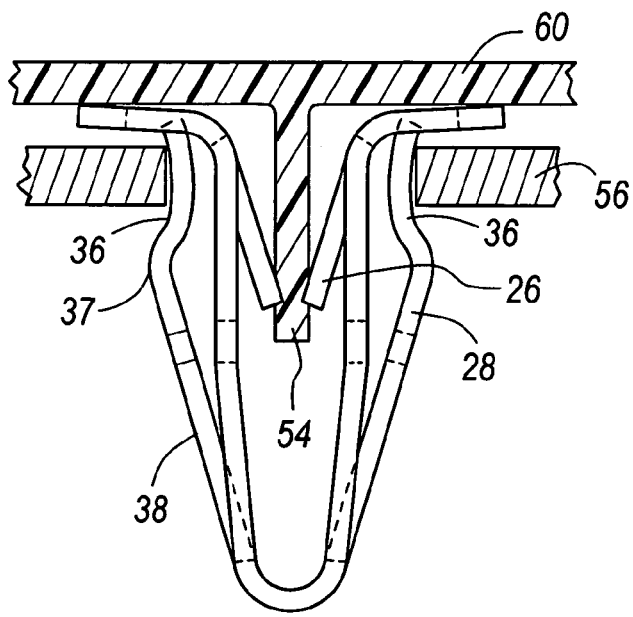
FIG. 11 is a cross-sectional view of the inserted fastener of FIG. 10b with corresponding trim component.
Figure 12:
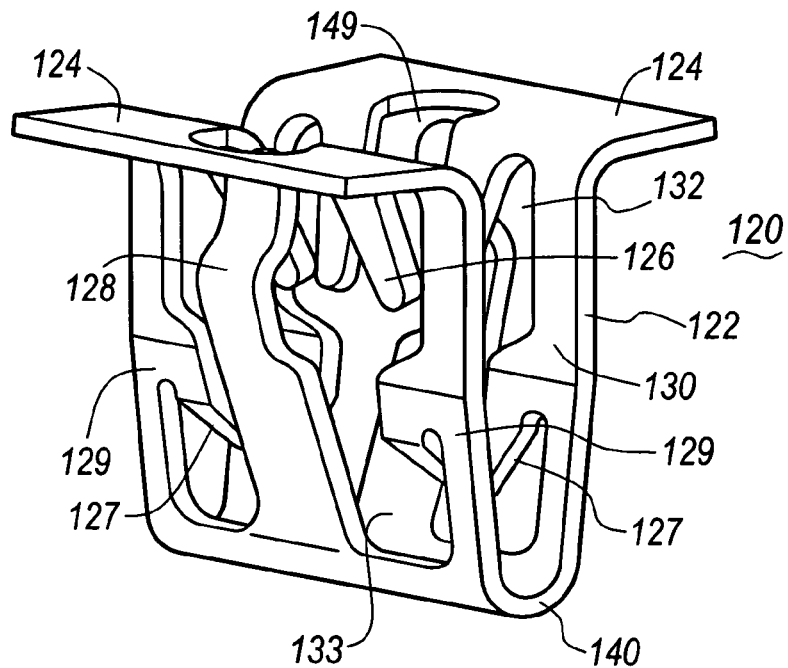
FIG. 12 is a perspective view of a fastener constructed in accordance with the teachings of a second embodiment of the present invention.

FIG. 11 depicts the coupling of the trim component 60 to the U-shaped fastener 20. Shown is the coupling flange 54 inserted between the finger members 26 of the U-shaped fastener 20.

It has been shown that the current fastener 20 is significantly more easily inserted into sheet metal structure 56 than removed from the sheet metal structure 56 once inserted. For example, the fastener as depicted has a required insertion force of about 10 pounds and a removal force of greater than 20 pounds.

Referring to FIGS. 12 through 20, a generally U-shaped fastener 120 in accordance with a second embodiment of the present invention is disclosed. The generally U-shaped fastener 120 is defined by a body portion 122 and a pair of top flanges 124. Integral with the top flanges 124 are two coupling finger member pair sets: a double pair of first finger members 126 and a double pair of second finger members 127 which are used to couple the generally U-shaped fastener 120 to a mounting flange (shown in FIG. 21). Additionally, the body portion 122 has a pair of abutting flanges 128 which generally lie outside the side members 129 and 130 of the body portion 122. The side members 129 and 130 define a pair of apertures, 132 and 133, which allow for the inward compression of the abutting flanges 128.

Figure 13:
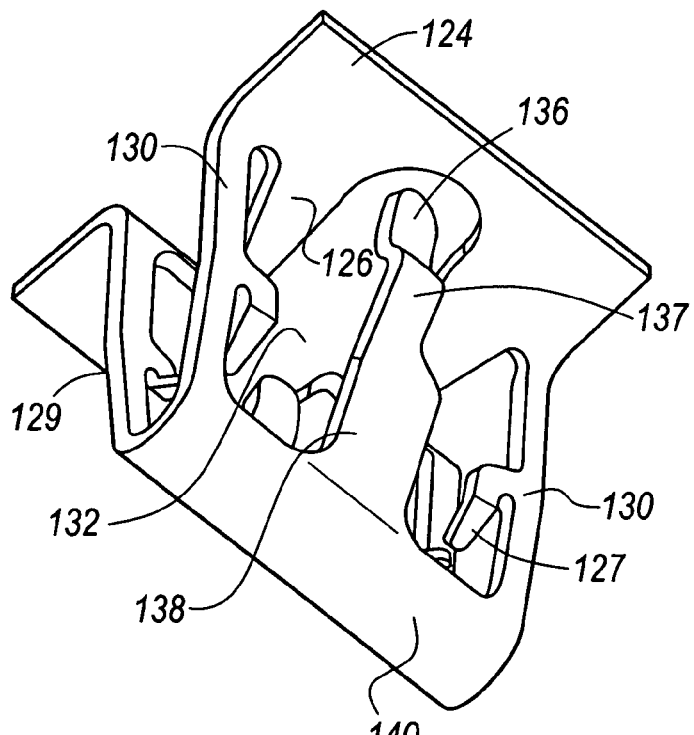
FIG. 13 is a lower perspective view of the fastener of FIG. 12.

Generally, as shown in FIG. 13, each of the abutting flanges 128 is further defined by having three portions. The first portion 136 is defined by a concave exterior engaging surface 150. The second portion 137, which acts as a transition to the third portion 138, is defined by a convex exterior surface. The third portion 138 functions to couple the abutting flange 128 to the base portion 140 of the body 122 of the generally U-shaped fastener 120.

Figure 14A:
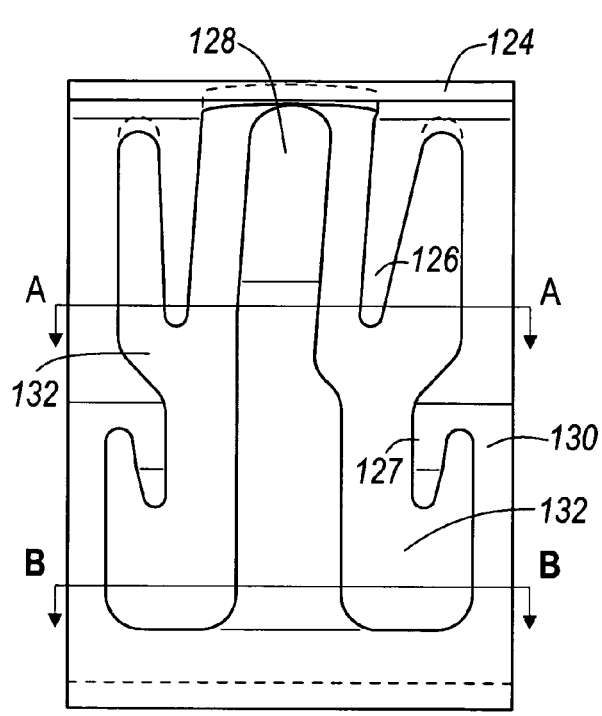
FIG. 14a is a side view of a portion of the fastener of FIG. 13 illustrating the spacing of the structures in greater detail.
Figure 14B:
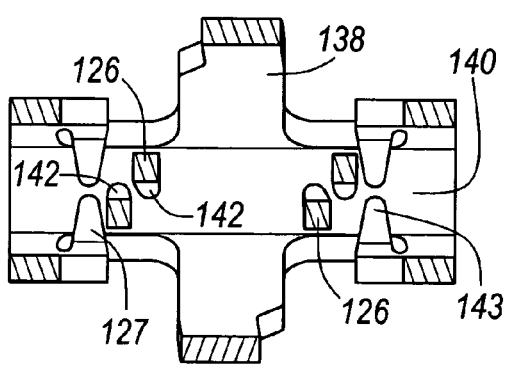
Figure 14C:
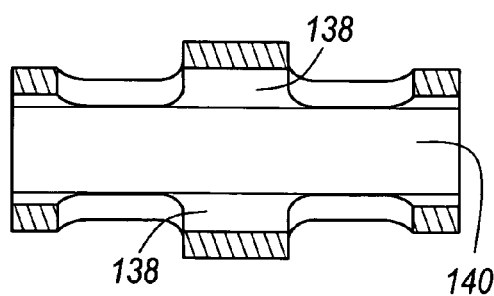

FIG. 14a depicts a first side view (along the axis of curvature for base portion 140) of the generally U-shaped fastener 120 of the second embodiment of the current invention. Shown is the relationship of a first finger member 126 and a second finger member 127 to an abutting flange 128, which is formed within the aperture 132. As best seen in the A-A cross-sectional view of FIG. 14b (reference from FIG. 14a) and in FIG. 15A (a second side view in a plane perpendicular to the axis of curvature for base portion 140), the tips 142 of the first finger members 126 and the tips 143 of the second finger members 127 are angled to frictionally engage a flange member 154 of a trim component 160 (see FIGS. 19 and 21). The angle of the first finger member 126 can be from about 15° to about 25° and, preferably, about 20°, while the angle of the second finger member 127 can be from about 50° to about 60° and, preferably, about 55°. The A-A cross-sectional view of FIG. 14b (reference FIG. 14a) and the B-B cross-sectional view of FIG. 14 show the relationship of the third portion 138 to the base member 140 of the body portion 122 for the fastener.

Figure 15A:
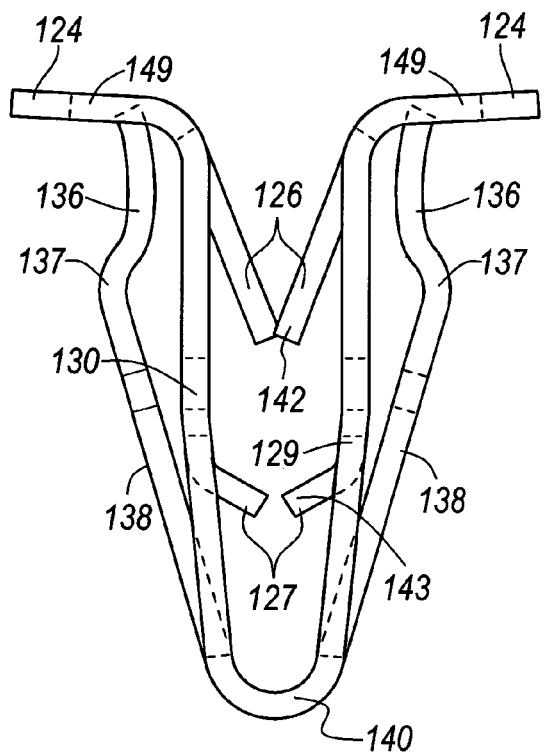

FIG. 15a depicts a second side view (in a plane perpendicular to the axis of curvature for base portion 140) of the U-shaped fastener 120 and shows the relationship of the abutting flanges 128 to the body portion 122. As can be seen, each of the top flanges 124 defines an upper keyhole slot 149, and slots 149 allow the movement of the abutting flanges 128 when they are compressed. Further depicted is the angular relationship of the side members 129 and 130 of the body portion with respect to the base 140 and the top flanges 124. It must be noted that while the finger members 126 and 127 are shown, any suitable fastener is usable. This includes but is not limited to a hole, a threaded hole, slots, or flanges.

Figure 15B:
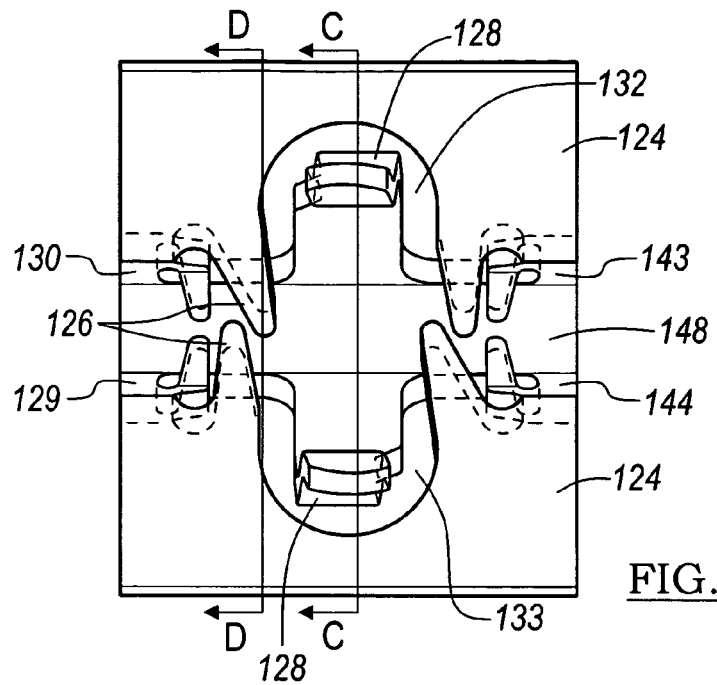

FIG. 15b depicts a top view of the generally U-shaped fastener 120. Defined by the side members 129 and 130 is a slot 148 which is used to engage the coupling flange 154 (see FIGS. 19 and 21) of a trim component 160. The concave exterior surface 150 of the abutting flanges 128 are used to engage sheet metal to hold the fastener in place. Also depicted is the interior surface 152 (FIG. 15c) and tips 142 of the first finger members 126 as well as tips 143 of second finger members 127, which collectively engage the surfaces of the coupling flange 154 (see FIGS. 19 and 21). Exterior concave surface 150 comprises silencer plating. The silencer plating is coated upon a corrosion resistant coating that is, in turn, coated onto the fastener substrate of abutting flange 128. Structural coating detail respective to exterior concave surface 150 is further described in the discussion of FIG. 22.

Figure 15C:
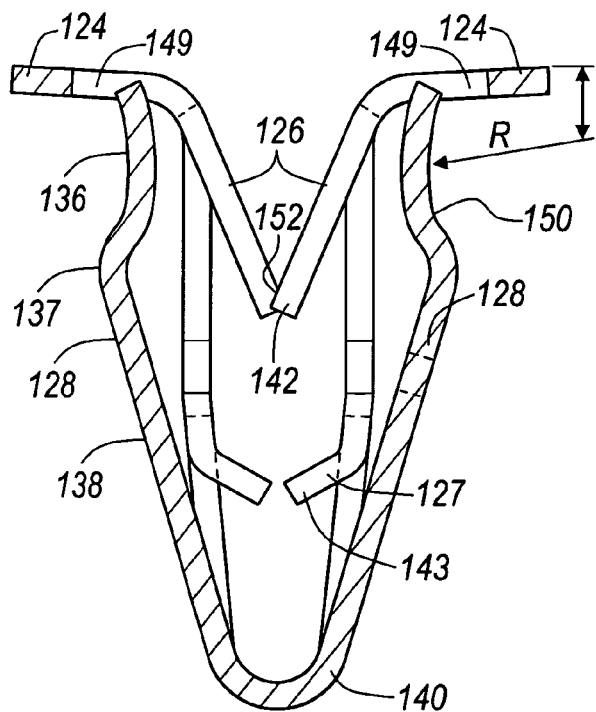
FIGS. 15c and 15d depict cross-sectional side views of the fastener depicted in FIG. 15b.
Figure 15D:
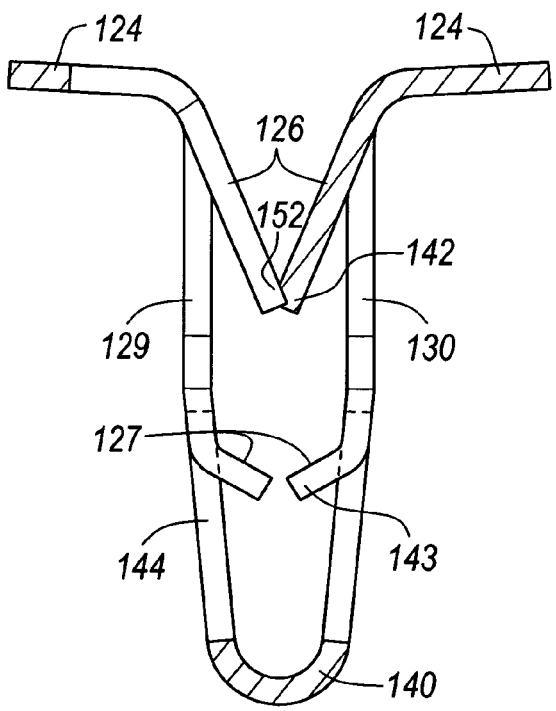

FIG. 15c displays the C-C cross-sectional view of the fastener as referenced in FIG. 15b. Depicted is the relationship of the abutting flanges 128 with the base member 140. Further, the cross-section details the radius of the exterior concave surface 150. The radius of the concave surface 150 generally can be from about 3.5 to about 6.0 millimeters and, preferably, about 4.75 millimeters. The center of curvature for the radius R is from about 2 to about 4 millimeters from the top of the fastener and, preferably, about 2.3 millimeters. The D-D cross-sectional view (reference in FIG. 15b) in FIG. 5d of the fastener best details the relationship of the first finger member 126 to the top flanges 124 and the first and second flange members 143 and 144.

Figure 16:
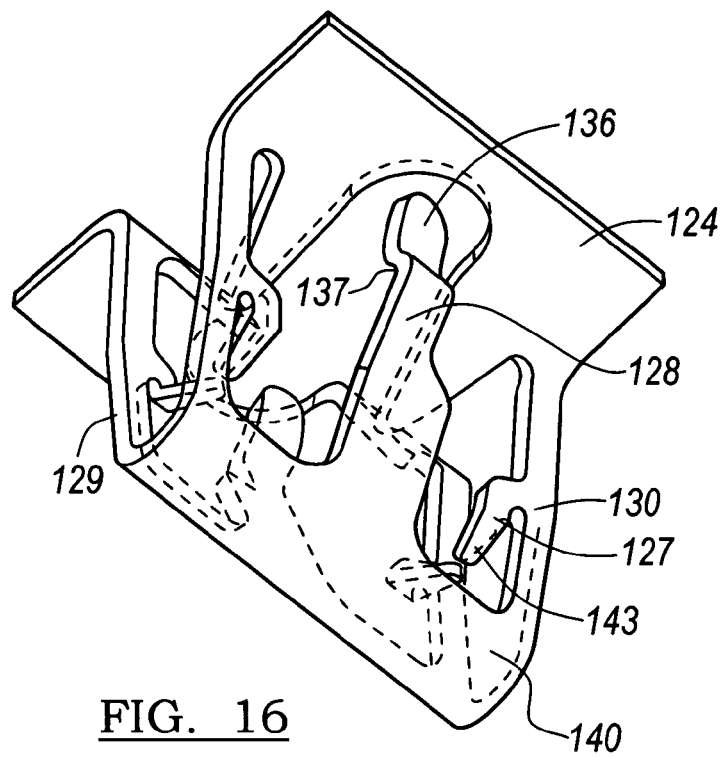
FIG. 16 is a lower perspective view of the fastener of FIG. 12.
Figure 17:
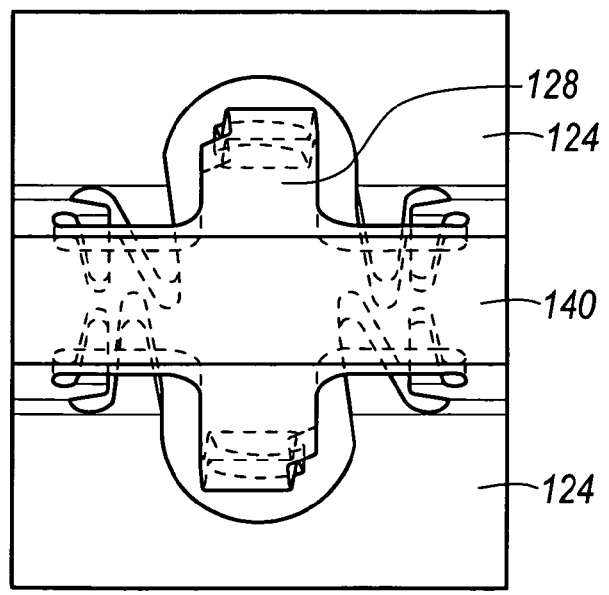
FIG. 17 is a top view of a portion of the fastener of FIG. 12, illustrating the clip structure in greater detail.
Figure 18:
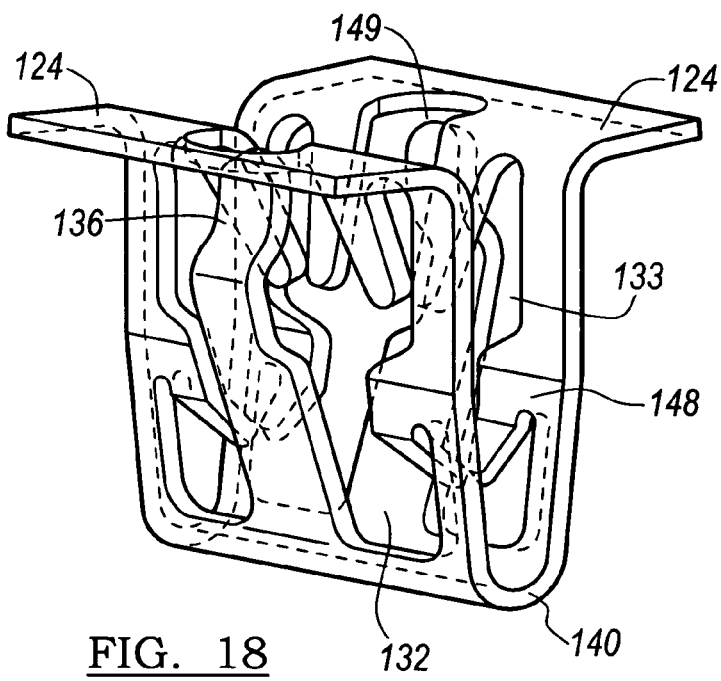
FIG. 18 is a perspective view of the fastener of FIG. 12.

FIGS. 16 through 18 are depictions of the U-shaped fastener 120 of the current invention with hidden components shown in phantom. Depicted is the relationship of the fastener components with various surfaces of the fastener.

Figure 19:
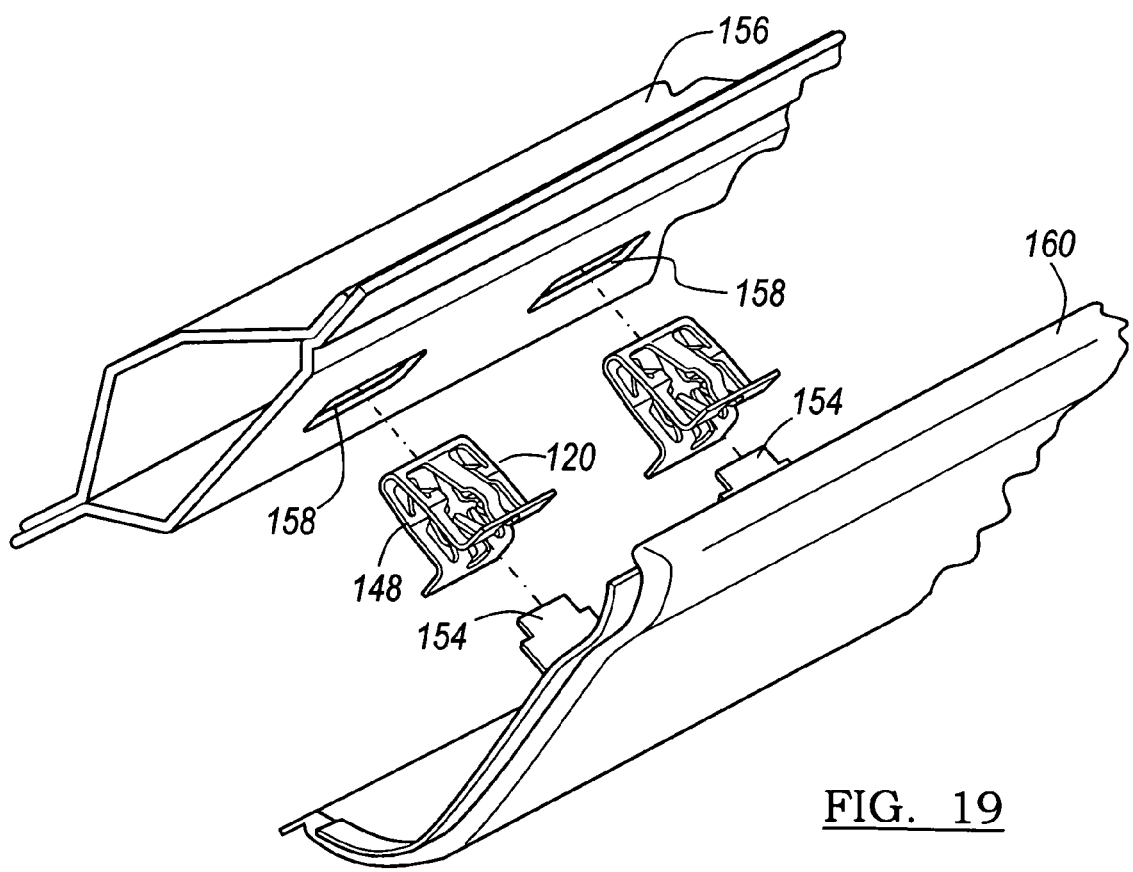
FIG. 19 is an exploded perspective view showing the fastener of FIG. 12 being used to mount an interior trim component.

FIG. 19 depicts the use of the U-shaped fastener 120 of the current invention. Shown is a sheet metal structure 156, which defines a pair of apertures 158. The apertures 158 are designed to accept the U-shaped fastener 120 to allow for the mating of a trim component 160 to the sheet metal 156. The trim component 160 has a pair of flanges 154, which are inserted into the slot 148 of the U-shaped fastener 120.

Figure 20A:
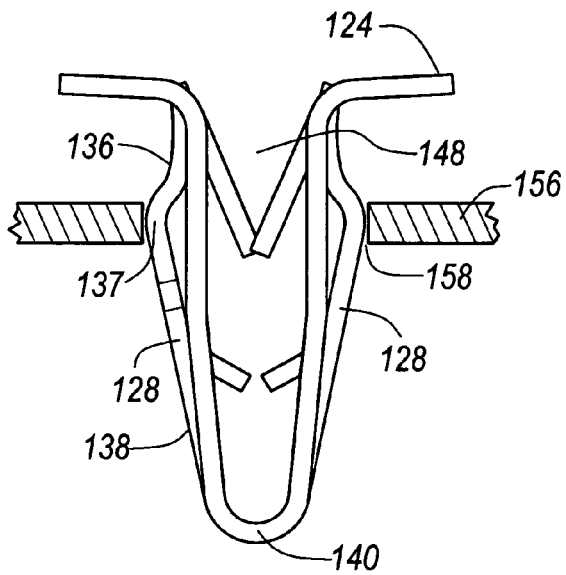
FIGS. 20a and 20b show the insertion of the fastener.
Figure 20B:
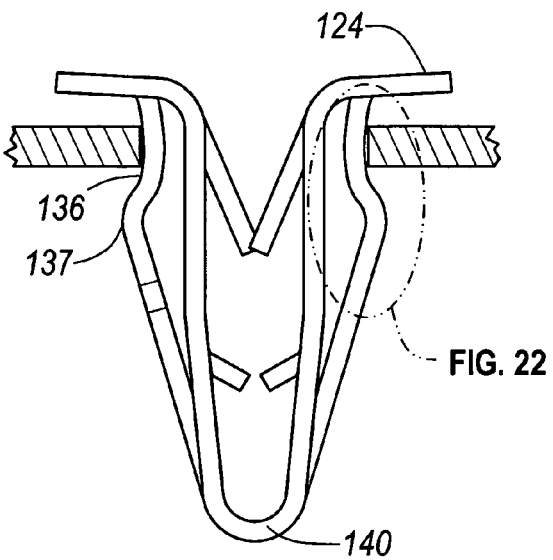

As best seen in FIG. 20a and FIG. 20b, the U-shaped fastener 120 is inserted into the aperture 158 of the sheet metal structure 156. As the fastener 120 is depressed into the aperture 158, the abutting flanges 128 are compressed toward each other and the centerline of the U-shaped fastener 120. This compression of the abutting flanges 128 continues until the sheet metal 156 of the aperture 158 reaches the second portion 137 of the abutting flanges. At this point, a transition occurs and the sheet metal 156 is allowed to engage (FIG. 20b) with the concave surface 156 of the first portion 136 of the abutting flanges 128.

Figure 21:
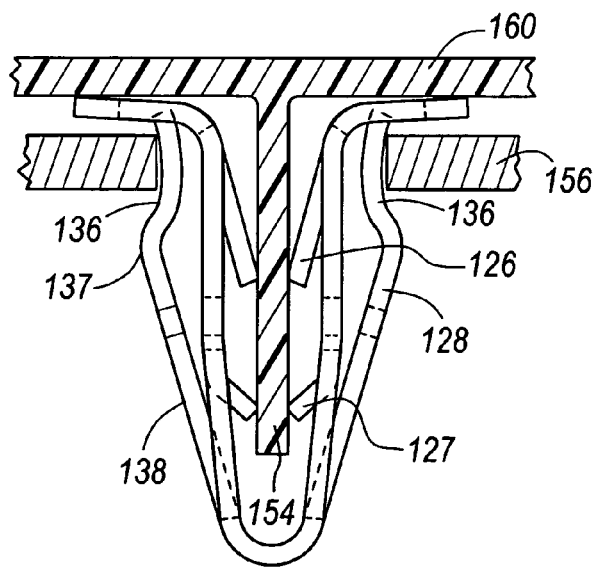
FIG. 21 is a cross-sectional view of the inserted fastener of FIG. 20b with corresponding trim component.

FIG. 21 depicts the coupling of the trim component 160 to the U-shaped fastener 120. Shown is the coupling flange 154 inserted between the first and second finger members 126 and 127 of the U-shaped fastener 120. In this regard, the bottom or minimal extremum of concave curvature for each concave surface 150 of the first portion 136 of each abutting flange 128 rests, in fastened position, against the defining edge of aperture 158 in sheet metal structure 156.

It has been shown that the current fastener 120 is significantly easier to insert into sheet metal structure 156 than removed form sheet metal structure 156 once inserted. For example, the fastener as depicted has a required insertion force of about 10 pounds and a removal force of greater than 20 pounds.

The silencer plating of the present invention reduces friction between the fastener and the sheet metal that causes squeaking or other noise related to vibrations between and/or among the coupled fastener and sheet metal components. In this regard, the silencer plating comprises a film or dry coating on the fastener where the coating (film) is plated onto its respective fastener substrate surface to provide a dry lubrication feature or attribute to the fastener surface that will reduce vibration noise and improve wear characteristics of any sheet metal surface against which the plating slides or vibrates. Examples of such surfaces benefiting from silencer plating are (a) surface 50 (FIG. 4) as deployed against sheet metal structure 56 (FIG. 11) and (b) surface 150 (FIG. 15C) as deployed against sheet metal structure 156 (FIG. 21). In preferred embodiments, the plating comprises a sulfur-containing dry lubricant such as, preferably, molybdenum disulfide. Another sulfur-containing dry lubricant for consideration in use is tungsten disulfide.

Molybdenum disulfide has a structure that allows the $MoS_2$ particles of the plating to slide past each other and relieve stresses between the underlying fastener and the sheet metal when they slide, even to a small degree, against each other. Without the plating to relieve the stresses, friction between the underlying fastener and the sheet metal generates acoustic vibrations and thereby causes excessive noise. Despite its benefits, use of the molybdenum disulfide is limited because it reacts with oxygen or water in the air to form corrosive products that then can corrode the metal flanges of the fastener. The present invention solves this problem by providing humidity and/or corrosion resistance to the molybdenum disulfide through use of a corrosion suppressant in chemically reactive contact with the lubricant coating. This corrosion suppressant is preferably the corrosion resistant coating further described herein. Furthermore, the use of the corrosion resistant coating provides improved adhesion of the molybdenum disulfide to the fastener. In preferred embodiments, the corrosion resistant coating comprises zinc. In alternative embodiments, the corrosion resistant coating comprises either manganese phosphate or zinc phosphate. Zinc coating is preferred insofar as good salt spray resistance to corrosion is achieved at 72 hours of salt spray exposure. If salt spray resistance is not an issue, manganese phosphate or zinc phosphate can also be used in the corrosion resistant coating. In yet another embodiment, the coating comprises a combination of zinc, manganese phosphate, and/or zinc phosphate.

The silencer plating and the corrosion resistant coating are applied to any or all of the fastener components, portions, and/or members. The corrosion resistant coating is applied using any suitable metal application technique or combination of techniques, including, but not limited to, immersion plating, chemical conversion, electroless plating, mechanical plating, detonation gun application, plasma arc, vacuum plasma, wire arc, chemical vapor deposition, electron beam evaporation, ion beam assisted deposition, ion implantation, ion plating, physical vapor deposition, sputtering, and vacuum metalizing. The silencer plating is then applied over the corrosion resistant coating using any suitable technique, including, but not limited to, rubbing or burnishing the molybdenum disulfide powder onto the coated substrate; dipping, brushing, or spraying the substrate with a dispersion of molybdenum disulfide in a volative solvent (and then evaporating the solvent); vacuum sputtering; or using a binder material (resin, silicate, phosphate, or ceramic) to adhere the molybdenum disulfide film to the substrate.

The fastener substrate may optionally be pre-treated before the application of the corrosion resistant coating. For example, in many cases it is desirable to pre-treat the substrate to remove a passivation layer that builds up on the metal substrate upon exposure to oxygen. In various embodiments, pre-treatment involves subjecting the surface to reducing conditions, which renders the substrate surface of the fastener more electrochemically active for receiving the coating. Other pre-treating methods include degreasing of the fastener surfaces before applying the corrosion resistant coating or etching of the corrosion resistant coating to increase the surface tension of the coating before applying the silencer plating. Subsequent treatment steps such as forced-air cooling may also be employed.

The corrosion resistant coating and the silencer plating are applied at any suitable thickness that does not interfere with the operation or purpose of the fastener (fitting into a mounting hole, for example) and also enables corrosion-protecting efficacy in the silencer plating from chemically-reactive contact between the corrosion resistant coating and the silencer plating. The corrosion resistant coating has a thickness of from at least a monolayer up to about 50 micrometers ($\mu m$). The silencer plating has a thickness of from at least a monolayer up to about 50 $\mu m$. The thickness of each coating is selected to provide adequate lubrication, promote adhesion of the molybdenum to the corrosion resistant coating, prevent corrosion of the molybdenum via chemical reaction between the corrosion suppressant and the silencer plating, prolong the endurance life of the silencer plating, and minimize noise from vibration of the fastener in its connected position. A preferred thickness for each of the corrosion resistant coating and the silencer plating is from about 1 $\mu m$ to about 50 $\mu m$ (more preferably, the silencer plating and corrosion resistant coating each have an independent thickness of from about 5 micrometer to about 20 micrometers). In this regard, chemically-reactive contact (necessary for suppressing long-term corrosion of the fastener abutting flange interface surface) between the silencer plating and the corrosion suppressant is enabled in many embodiments by a relatively thin layer of corrosion resistant coating underlying the relatively thin layer of silencer plating even as lubricity of the silencer plating on the interface surface of the fastener is maximized though an interface surface of high purity molybdenum disulfide. The chemically-reactive contact provides a material continuum enabling migration of ions, electrons, and atoms among the interconnected material system of the fastener substrate abutting flange, the corrosion suppressant, and the silencer plating such that detrimental corrosion of the lubricated surface (the interface surface) of the abutting flange essentially does not occur and so that the fastener continues to provide a "quiet" fastening to the component (panel) to which it is attached.

Figure 22:
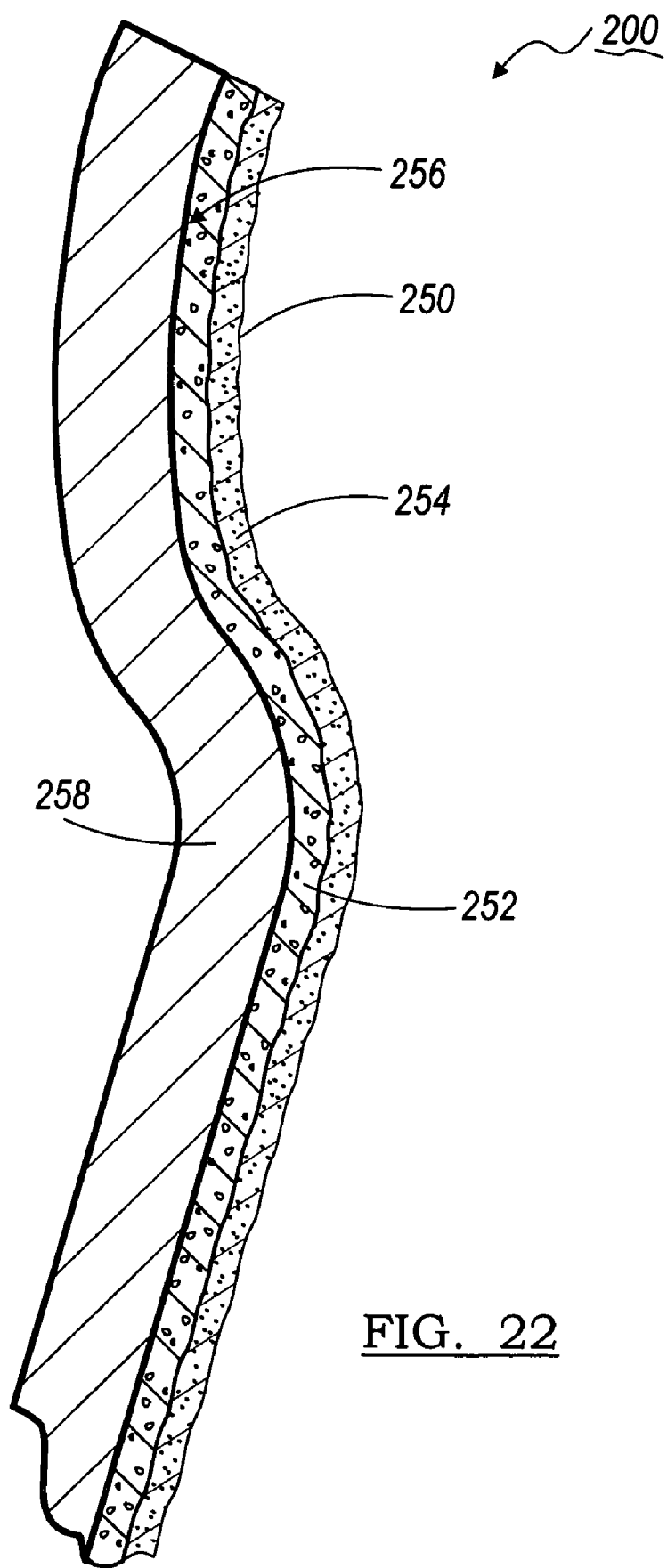
FIG. 22 is a cross-sectional view of a coated portion of fastener substrate from a fastener.

In further detail of the fastener substrate coatings, FIG. 22 shows a cross-sectional view 200 of a coated portion of fastener substrate 258 from a fastener (such as a portion of abutting flange 28 of fastener 20 in the region of exterior concave surface 50 or a portion of abutting flange 128 of fastener 120 in the region of exterior concave surface 150). Note that relative thicknesses of substrate 258, corrosion resistant coating 252, and silencer plating 254 in FIG. 22 are not accurate in visual scale, and the coatings are depicted in exaggerated relative thicknesses for purposes of clear description; the actual relative dimensions provide relative thicknesses of corrosion resistant coating 252 and of silencer plating 254 that are very substantially less that those depicted in FIG. 22 when compared to the thickness of substrate 258. In cross-sectional view 200, fastener substrate concave surface 256 interfaces to corrosion resistant coating 252. Resistant coating 252 has a preferred thickness of from at least a monolayer up to about 50 micrometers ($\mu m$). Corrosion resistant coating 252 also interfaces to silencer plating 254. Silencer plating 254 preferably has a thickness of from at least a monolayer up to about 50 micrometers ($\mu m$). More preferably, the silencer plating and corrosion resistant coating each have an independent thickness of from about 5 micrometer to about 20 micrometers.

Concave surface 250 references coating detail in either exterior concave surface 50 (in abutting flange 28 of fastener 20) or exterior concave surface 150 (in abutting flange 128 of fastener 120) respective to previously described embodiments. By providing a corrosion-stabilized lubricated interfacing surface made of a material having a low inter-molecular shearing force (a corrosion-stabilized lubricated interfacing surface) for a surface portion of a fastener that facilitates optional removal (detachment) from a component to which it is attached from use of elastic abutting flanges that slidably and compressively interface (via compression and/or torsion spring forces) to the component (such as a panel as described herein) with side movement and/or slippage being highly restricted (but not rigidly restricted) through use of smoothed surface geometry (such as a concave interfacing surface with the interface to the component being positioned at essentially the bottom or minimal extremum of concave curvature as previously described), the fastener attaches to the component with a "quiet" compressive joint in operationally dynamic use of the connected combination of fastener and component (panel) when the fastener is in fastened position. In this regard, when the lubricated surface of the fastener is subjected to limited oscillatory slippage against the surface of the component from vibrations that modify the inertial relative positioning of the component and the fastener (when the fastener is essentially in fastened position), acoustic pressure waves that emanate from rubbing (limited oscillatory slippage) between the interfacing surface of the fastener and the component should be essentially non-audible to the human ear.

The corrosion resistant coating and the silencer plating are applied over all surfaces of the fastener substrate in one fastener embodiment. A dipping procedure to fully immerse the fastener substrate in each coating (with appropriate drying of the corrosion resistant coating prior to immersion in the silencer plating) is used in one embodiment in providing such a comprehensive coating. In another embodiment, the corrosion resistant coating and the silencer plating are applied only to surfaces of the fastener substrate that interface to other component surfaces. A procedure of masking and spraying is used in one embodiment in providing such a precision-positioned coating to each interface surface of the fastener. In yet another embodiment for coating interface surfaces of the fastener, the corrosion resistant coating and the silencer plating are applied to the general regions of surfaces of the fastener substrate that interface to other component surfaces. A procedure of spraying to a target area on the fastener is used in one embodiment of providing such a regional coating. The thin layer of corrosion resistant coating underlying the thin layer of silencer plating enables chemically-reactive contact between the silencer plating and the corrosion suppressant while maximizing lubricity of the silencer plating on the interface surface of the fastener.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A fastener adapted to removably mount an object in a mounting aperture of a panel, the fastener comprising:
   a fastener body having two opposing side members and defining a second aperture configured to accept at least a portion of the object;
   at least one elastic abutting flange defining an exterior concave portion extending a width of said abutting flange and configured to engage an inner surface of the mounting aperture when the fastener is inserted into the mounting aperture, the elastic abutting flange being disposed between the fastener body and the mounting aperture;
   corrosion resistant coating; and
   a sulfur-containing silencer plating directly overlying a portion of the corrosion resistant coating; said silencer plating being a dry lubricant which is stable in air and that relieves stress between the fastener and the mounting aperture to facilitate relative movement between the fastener and the mounting aperture, said fastener having an insertion force to insert the fastener within the mounting aperture and an extraction force needed to remove the fastener from the mounting aperture, said extraction force being more than the insertion force.

2. The fastener according to claim 1 wherein the side members are generally parallel.

3. The fastener according to claim 2 wherein at least one of the side members defines a third aperture configured to allow inward compression of an abutting flange.

4. A fastener according to claim 3 wherein a pair of elastic abutting flanges are configured to engage the mounting aperture.

5. The fastener according to claim 4 further comprising a first pair of finger members disposed along the side members, configured to slidably accept a portion of the object, and configured to tightly engage the object to the fastener after the portion is slidably accepted.

6. The fastener according to claim 5 further comprising a second pair of finger members disposed along the side members, configured to slidably accept a portion of the object, and configured to tightly engage the object to the fastener after the portion is slidably accepted.

7. The fastener according to claim 1 wherein the silencer plating comprises molybdenum disulfide or tungsten disulfide.

8. The fastener according to claim 1, wherein the corrosion resistant coating comprises a corrosion suppressant selected from the group consisting of zinc, manganese phosphate, zinc phosphate, and a combination thereof.

9. The fastener according to claim 1, wherein the silencer plating and corrosion resistant coating each have an independent thickness of from about 1 micrometer to about 50 micrometers.

10. A U-shaped fastener adapted to be removably mounted within a mounting aperture of a panel, the fastener comprising:
    a body defining a pair of generally parallel members coupled by a curved end member, at least one of the parallel members comprising a first and second pair of finger members configured to slidably accept a coupling flange and to tightly engage the coupling flange to the fastener after the coupling flange is slidably accepted;
    a pair of abutting flanges, each abutting flange of the pair independently defining an exterior concave surface extending a width of the abutting flange and configured to engage an inner surface of the mounting aperture when the fastener is inserted into the mounting aperture;
    corrosion resistant coating disposed on each abutting flange where the exterior surface is configured to engage the inner surface; and
    a sulfur-containing dry lubricant silencer plating directly overlying a portion of the corrosion resistant coating and that relieves stress between the fastener and the mounting aperture to facilitate relative movement between the fastener and the mounting aperture, said fastener having an insertion force to insert the fastener within the mounting aperture and an extraction force needed to remove the fastener from the mounting aperture, said extraction force being more than the insertion force.

11. The fastener according to claim 10 wherein the abutting flanges are coupled to the curved end member.

12. The fastener according to claim 10 wherein each finger member of the finger members independently comprise a tip portion capable of coupling the finger members to the coupling flange.

13. The fastener according to claim 10 wherein the abutting flanges are disposed between the body and the inner surface of the panel mounting aperture.

14. The fastener according to claim 10 wherein the abutting flanges further comprise an exterior convex surface.

15. The fastener according to claim 10 wherein the generally parallel members define an aperture configured to allow inward compression of the abutting flanges.

16. The fastener according to claim 15 wherein the abutting flanges are deformable toward the body.

17. The fastener according to claim 15 wherein the corrosion resistant coating comprises a corrosion suppressant selected from the group consisting of zinc, manganese phosphate, zinc phosphate, and a combination thereof.

18. The fastener according to claim 10 wherein the silencer plating comprises molybdenum disulfide or tungsten disulfide.

19. A fastener for removably mounting a coupling flange in a panel aperture, the fastener comprising:
    a base portion;
    two opposing side walls integrally connected to the base portion and forming a substantially U-shaped body, each side wall of the two opposing side walls having an outwardly extending top flange member;
    a pair of elastic abutting flanges integrally formed with and outwardly extending from the base portion;
    a first pair of spaced apart finger members integrally formed with each top flange member;
    corrosion resistant coating disposed on each abutting flange; and
    a sulfur-containing dry lubricant silencer plating directly overlying a portion of the corrosion resistant coating and that relieves stress between the fastener and the panel aperture to facilitate relative movement between the fastener and the panel aperture, wherein the pair of finger members inwardly extend into the body of the fastener and are configured to grippingly engage the coupling flange; said fastener having an insertion force to insert the fastener within the mounting aperture and an extraction force needed to remove the fastener from the mounting aperture, said extraction force being more than the insertion force.

20. A fastener according to claim 19 wherein each abutting flange independently defines a concave exterior surface extending a width of the abutting flange, wherein the concave surface is configured to engage an inner surface of the panel aperture.

21. A fastener according to claim 20 wherein the concave exterior surface has a radius of curvature from about 3.5 to about 6 mm.

22. A fastener according to claim 19 wherein the fastener is configured for insertion into the panel aperture with an insertion force less than about 10 pounds, and for removal from the panel aperture with a removal force greater than about 20 pounds.

23. A fastener according to claim 19 wherein the silencer plating comprises molybdenum disulfide or tungsten disulfide.

24. A fastener according to claim 19, wherein the corrosion resistant coating comprises a corrosion suppressant selected from the group consisting of zinc, manganese phosphate, zinc phosphate, and a combination thereof.

25. A fastener having at least one metallic abutting flange for slidably and compressively interfacing against the inner surface of a mounting aperture, the fastener comprising:
   a dry sulfur-containing lubricant plated surface of the flange so that the lubricant surface bears against the inner surface; and
   corrosion suppressant in chemically reactive contact with the lubricant surface,
   wherein the lubricant surface is configured to relieve stress between the fastener and the mounting aperture to facilitate relative movement between the fastener and the mounting aperture and to suppress acoustic waves generated from vibrating movement of the inner surface against the flange so that the acoustic waves are essentially inaudible to the human ear, and wherein said fastener having an insertion force to insert the fastener within the mounting aperture and an extraction force needed to remove the fastener from the mounting aperture, said extraction force being more than the insertion force.

26. A method for attaching a component to a mounting aperture of a structural support so that the component can be optionally removed from the support, the method comprising;
   affixing a fastener to the component, the fastener having at least one metallic abutting flange that slidably and compressively interfaces against an inner surface of the mounting aperture, the flange having a dry sulfur-containing lubricant surface for bearing against the inner surface, and the flange having corrosion suppressant in chemically reactive contact with the lubricant; and
   inserting the fastener within the mounting aperture to compressively bear the abutting flange against the inner surface,
   wherein the lubricant surface is a plated surface configured to relieve stress between the fastener and the mounting aperture to facilitate relative movement between the fastener and the mounting aperture and to suppress acoustic waves generated from vibrating movement of the inner surface against the flange so that the acoustic waves are essentially inaudible to the human ear, and wherein said fastener having an insertion force to insert the fastener within the mounting aperture and an extraction force needed to remove the fastener from the mounting aperture, said extraction force being more than the insertion force.

27. The method of claim 26 wherein the lubricant surface comprises molybdenum disulfide or tungsten disulfide.

28. The method of claim 26 wherein the corrosion suppressant is selected from the group consisting of zinc, manganese phosphate, zinc phosphate, and a combination thereof.

* * * * *